(12) United States Patent
Stiesdal

(10) Patent No.: US 8,358,028 B2
(45) Date of Patent: Jan. 22, 2013

(54) WIND TURBINE

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 770 days.

(21) Appl. No.: 12/542,765

(22) Filed: Aug. 18, 2009

(65) Prior Publication Data

US 2010/0045047 A1 Feb. 25, 2010

(30) Foreign Application Priority Data

Aug. 20, 2008 (EP) .................................... 08014800

(51) Int. Cl.
*F03D 9/00* (2006.01)
*H02P 9/04* (2006.01)
(52) U.S. Cl. ......................................................... 290/55
(58) Field of Classification Search ................ 290/55, 290/44, 54, 43
See application file for complete search history.

(56) References Cited

U.S. PATENT DOCUMENTS

| | | | |
|---|---|---|---|
| 4,291,235 A | 9/1981 | Bergey, Jr. et al. | |
| 6,483,199 B2 | 11/2002 | Umemoto et al. | |
| 6,781,276 B1 | 8/2004 | Stiesdal et al. | |
| 6,833,633 B2* | 12/2004 | Wobben | 290/55 |
| 6,866,423 B2* | 3/2005 | Faltus et al. | 384/559 |
| 7,119,453 B2 | 10/2006 | Bywaters et al. | |
| 7,154,191 B2* | 12/2006 | Jansen et al. | 290/55 |
| 7,154,192 B2* | 12/2006 | Jansen et al. | 290/55 |
| 7,154,193 B2* | 12/2006 | Jansen et al. | 290/55 |
| 7,205,678 B2* | 4/2007 | Casazza et al. | 290/55 |
| 7,385,305 B2* | 6/2008 | Casazza et al. | 290/55 |
| 7,385,306 B2* | 6/2008 | Casazza et al. | 290/55 |
| 7,548,008 B2* | 6/2009 | Jansen et al. | 310/266 |
| 7,687,932 B2* | 3/2010 | Casazza et al. | 290/55 |
| 7,830,063 B2* | 11/2010 | Jansen et al. | 310/266 |
| 7,839,048 B2* | 11/2010 | Jansen et al. | 310/266 |
| 7,893,555 B2* | 2/2011 | Casazza et al. | 290/55 |
| 2006/0152014 A1 | 7/2006 | Grant et al. | |
| 2008/0142284 A1* | 6/2008 | Qu et al. | 180/65.6 |
| 2008/0315698 A1* | 12/2008 | El-Refaie et al. | 310/124 |
| 2011/0115234 A1* | 5/2011 | Stiesdal | 290/55 |

FOREIGN PATENT DOCUMENTS

| | | |
|---|---|---|
| DE | 201 16 649 U1 | 1/2002 |
| EP | 1612415 A2 | 1/2006 |
| EP | 1641102 A1 | 3/2006 |
| WO | WO 02/05408 A1 | 1/2002 |
| WO | WO 02/057624 A1 | 7/2002 |
| WO | WO 03/023943 | 3/2003 |
| WO | 2005075822 A1 | 8/2005 |

OTHER PUBLICATIONS

Machine Translation of WO 2005 075822. 3 pages, Apr. 23, 2012.*
Machine Translation of WO 2005 075822-2. 1 page. Apr. 23, 2012.*

* cited by examiner

*Primary Examiner* — Javaid Nasri

(57) ABSTRACT

A wind turbine is provided. The wind turbine includes a direct drive generator with a stator arrangement, a rotor arrangement substantially arranged around the stator arrangement and a longitudinal center axis. The stator arrangement includes a stator support structure, which includes at least one substantially radial extending stator support element. The stator support element is attached to a substantially parallel to the center axis extending stationary shaft, is substantially rigid in the radial direction and is at least partially in a certain extent flexible in the directions of the center axis of the generator.

15 Claims, 3 Drawing Sheets

WIND TURBINE

CROSS REFERENCE TO RELATED APPLICATIONS

This application claims priority of European Patent Office application No. 08014800.0 EP filed Aug. 20, 2008, which is incorporated by reference herein in its entirety.

FIELD OF INVENTION

The invention relates to a wind turbine comprising a direct drive generator.

BACKGROUND OF INVENTION

In principle there are two main types of wind turbines in view of the drive configuration of a wind turbine. The first type of a wind turbine is the more classical type of a wind turbine comprising a gearbox arranged between the main shaft and a generator of the wind turbine. The second type of a wind turbine is a gearless type comprising a direct drive or a directly driven generator. Such a direct drive generator can be made as a synchronous generator with winded rotor or with permanent magnets attached to the rotor, or it can be designed as an alternative type of a generator. Independently from the type of a direct drive generator it is desirable that the width of the air gap between the rotor and the stator of the generator is preferably maintained constantly or at least within certain tolerances during the operation of the wind turbine and the direct drive generator respectively even when the arrangement of wind turbine rotor, main shaft and direct drive generator is subject to loads.

SUMMARY OF INVENTION

Therefore different bearing arrangements for a drive configuration of a wind turbine comprising a direct drive generator were developed. Up to now the classical bearing arrangement of a direct drive generator is a two-bearing arrangement. Thereby the rotor of the generator which is connected to the wind turbine rotor is supported with two bearings towards a stationary inner shaft or a fixed inner shaft. The stator is on one side attached to the stationary inner shaft. Thus the rotor can turn relatively to the stator around the stationary inner shaft. Wind turbines with such a design are e.g. described in EP 1 641 102 A1 and U.S. Pat. No. 6,483,199 B2. The drawback of such a design is that the one-side support of the stator makes it difficult to maintain the width of the air gap at least substantially constant at the unsupported side of the stator in particular when the entire generator structure is not only subject to gravity and mass inertia but also to unbalanced magnetic pull. In order to reduce this drawback a direct drive generator with such a two-bearing arrangement needs a large and heavy stator support structure capable of absorbing relatively large bending moments of the stator. Such a stator support structure is e.g. described in WO 02/05408 A1 wherein the stator support structure comprises a support construction having a plenty of support arms.

In an alternative design the two-bearing arrangement is replaced with a single bearing with a stationary inner bearing part attached to a stationary inner shaft and a rotating outer bearing part supporting the rotor of the direct drive generator. Wind turbines comprising a direct drive generator with a single bearing are disclosed in US 2006/0152014 A1 and WO 02/057624 A1. But the replacement of the two bearings with a single bearing does not substantially change the drawback of the unilaterally supported stator structure.

In some further solutions the stationary inner shaft concept is replaced with a rotating shaft concept. Since the stator of the generator is supported on both sides according to the rotating shaft concept, it is easier to maintain the width of the air gap between the rotor and the stator of the generator at least substantially constantly. There are two known variants of the rotating shaft concept, one with a two-bearing arrangement and one with a four-bearing arrangement.

According to the two-bearing arrangement, the bearings of the generator act as bearings of a main shaft for the wind turbine which main shaft is connected to the wind turbine rotor. The stator structure is supported towards the main shaft and attached to a bedplate of the wind turbine. Wind turbines having such a design are disclosed in U.S. Pat. No. 7,119,453 B2 and WO 03/023943 A2. A drawback of this design is that the stator structure needs to be dimensioned to absorb and transfer all wind turbine rotor loads, i.e. the weight of the wind turbine rotor and all asymmetric aerodynamic loads to maintain the width of the air gap within the necessary tolerances. On large wind turbines this leads to very heavy and expensive stator structures.

In the four-bearing arrangement the main shaft of the wind turbine which is connected to the wind turbine rotor on its one end is supported by its own two bearings and carries at its other end the direct drive generator. The direct drive generator has a two-bearing arrangement for the centring of the rotor inside the stator. An example of such a wind turbine is described in U.S. Pat. No. 6,781,276 B1. In this main shaft mounted arrangement the generator stator is carried by the generator rotor and torque is transferred from the generator to the wind turbine bedplate through a torque arm arrangement. The torque arm arrangement needs to comprise some kind of flexibility, e.g. implemented with rubber elements, to allow for minor misalignments between the main shaft-generator structure and the turbine bedplate. The bilateral support of the stator on the rotor enables for a relatively lightweight stator structure. The main drawback of this design is that a total of four bearings are required, and that the full torque has at least partially to pass through these bearings. For large wind turbines this means comparatively large and expensive bearings. Furthermore, for large wind turbines the torque arm arrangement becomes a comparatively substantial and heavy structure.

In U.S. Pat. No. 4,291,235 a further bearing arrangement for a wind turbine is described. The wind turbine comprises a stationary shaft as well as a direct drive generator having an inner stator and an outer rotor. The inner stator is arranged on the stationary shaft. The outer rotor is connected to the hub of the wind turbine, on the front side connected to the stationary shaft by a front bearing and on the rear side connected to the stationary shaft by rear bearing. Thereby the bearing arrangement is not optimal in relation to the load capacity.

Furthermore in the not pre-published EP 08012253.4 a wind turbine comprising a direct drive generator having a rotor arrangement and a stator arrangement is described. The rotor arrangement is substantially arranged around the stator arrangement. The stator arrangement is attached to a stationary shaft. A rotatable shaft is arranged inside the stationary shaft and supported by two main bearings. The rotor arrangement comprises a front endplate, a rear endplate and a hollow cylinder element with permanent magnets connecting the front and the rear endplate. The front endplate is connected to the rotatable shaft and the rear endplate is supported against the stationary shaft by a third bearing. Therefore the rotor arrangement can turn relatively to the stator arrangement. Thus in the not pre-published EP 08012253.4 a three bearing arrangement is described.

Such a three bearing structure can be sometimes statically undetermined. In this case any misalignments due to mounting tolerances or any deformations arising as a result of gravity or external loads to the rotatable shaft and/or the direct drive generator could potentially lead to an uneven load distribution between the three bearings of the wind turbine which in turn could cause a premature bearing failure. The front endplate of the rotor arrangement is therefore at least partially in a certain adequate extent flexible in the directions of a centre axis of the main shaft.

Thus the potential problem of a static indeterminacy of the three bearing arrangement is eliminated by establishing a sufficient flexibility of the front endplate in the directions of the centre axis of the main shaft. The front endplate acts like a membrane supporting the stator substantially firmly in the radial direction so as to maintain the air gap, but flexing readily so as to enable e.g. a bending of the main shaft with no major resistance. In this way an uneven load distribution between the three bearings of the wind turbine is at least reduced, preferably avoided.

But in some three bearing arrangements it is not possible to provide the flexibility in the front endplate of the rotor arrangement, e.g. when the hub and the rotor arrangement form a substantially stiff unit.

It is therefore an object of the present invention to provide a wind turbine as initially mentioned having sufficient flexibility in the direct drive generator and thus being inter alia appropriate for a three bearing arrangement.

This object is inventively achieved by a wind turbine comprising a direct drive generator having a stator arrangement, a rotor arrangement substantially arranged around the stator arrangement and a longitudinal centre axis, the stator arrangement comprises a stator support structure, which stator support structure comprises at least one, substantially radial extending stator support element wherein the stator support element is attached to a substantially parallel to the centre axis extending stationary shaft, is substantially rigid in the radial direction and is at least partially in a certain extent flexible in the directions of the centre axis of the generator. As a consequence of the invention a substantially stiff hub-rotor-arrangement or design is possible, because the required flexibility is now in the stationary part of the direct drive generator which is also advantageous in view of fatigue. Thereby the potential problem of a static indeterminacy in particular in case of a three bearing arrangement of the wind turbine is eliminated by establishing a sufficient flexibility of the stator support element in the directions of the centre axis of the generator. According to this the stator support element acts like a membrane supporting the stator arrangement substantially firmly in the radial direction so as to maintain the air gap between the rotor arrangement and the stator arrangement, but flexing readily with no major resistance in the direction of the centre axis to follow a bending of the rotor arrangement that the air gap between the rotor arrangement and the stator arrangement is substantially maintained constant or within certain required tolerances.

In a variant of the invention the stator support element is a ring-shaped support element in form of a ring-shaped plate. The stator support element or the ring-shaped plate is able to be compact or massive with no openings in the plate. In an alternative solution the stator support element is able to comprise a spoke structure, like a spoked wheel.

In a further variant of the invention the stator support element is made of steel or fibreglass. The stator support element is able to have a thickness of about 10 to 50 mm, preferably of about 10 to 15 mm measured in the direction of the centre axis. Thus it can be assured that an appropriate flexing in the directions of the centre axis of the generator is possible.

The stator support structure carries a lamination stack with at least one winding, typically with a plurality a windings. The lamination stack is able to be directly attached to the stator support element or the stator support structure comprise a kind of hollow cylinder attached to the stator support element and carrying the lamination stack. The lamination stack is able to be segmented. Thus a plurality of ring segment shaped lamination stack segments are able to form in their entirety the ring-shaped lamination stack.

According to an embodiment of the invention the rotor arrangement comprises a preferably rigid or stiff, ring-shaped front endplate and a preferably rigid or stiff hollow cylinder element connected with each other, wherein e.g. permanent magnets are arranged on the inside of the hollow cylinder element oppositely to the stator arrangement for power generation.

In a further embodiment of the invention the rotor arrangement or the front endplate of the rotor arrangement is at least indirectly connected to a rotatable shaft and/or a hub for turning together with the rotatable shaft and/or the hub and relatively to the stator arrangement. Preferably the rotatable shaft is supported inside the stationary shaft by means of at least a front and a rear main bearing or the front endplate of the rotor arrangement or the rotor arrangement in general is on the front side at least indirectly supported or arranged on the stationary shaft by a front main bearing, preferably a four-point bearing, wherein the stator support element is arranged close to or directly adjacent or directly above the front main bearing. In this way the preconditions are well that the width of the air gap between the rotor arrangement and the stator arrangement is maintained substantially constant or within required tolerances in particular at the front end of the direct drive generator.

According to a variant of the invention the stator arrangement including the lamination stack comprises a longitudinal extension in the direction of the centre axis of the generator, wherein the stator support element is substantially arranged on the front side of the stator arrangement.

In another variant of the invention the stator support element of the stator arrangement comprising the longitudinal extension in the direction of the centre axis of the generator is substantially arranged in the middle of the stator arrangement. In this case the lamination stack is substantially supported in its centre of gravity.

In particular, when the stator support element is substantially arranged on the front side of the stator arrangement, the stator support structure comprises at least one spring and/or at least one damper connected to the stationary shaft. Preferably the at least one spring and/or the at least one damper are arranged on the rear side of the stator support structure. The at least one spring and the at least one damper are able to be arranged in series or in parallel. Thus the width of the air is able to be influenced by the at least one spring and/or the at least one damper.

In an embodiment of the invention the rotor arrangement is on the rear side supported against the stator arrangement by a support bearing, e.g. a four-point bearing. In this way a two side support of the rotor arrangement is achieved with advantages in view of the maintenance of the width of the air gap.

Alternatively the rear end of the rotor arrangement is unsupported.

In particular in this case it is advantageous, when the width of the air gap between the stator arrangement and the rotor arrangement is measured by means of at least one distance sensor and/or by interpretation of the generated currents and/or voltages of the direct drive generator. The at least one distance sensor is able to be attached on the rotor arrangement or on the stator arrangement to measure the width of the air gap. But it is also possible to interpret or evaluate the generated currents and/or voltages of the direct drive generator during operation and e.g. to compare the resulting values with known or calibrated reference values for which the width of the air gap was determined. Thus also in this way the actual width of the air gap is able to be determined. By a continuous or an intermittent measurement of the width of the air gap, the width of the air gap is able to be actively monitored.

According to a variant of the invention the width of the air gap between the stator arrangement and the rotor arrangement is actively regulated and/or controlled, in particular based on the determined width of the air gap. The regulation and/or the control of the width of the air gap is able to be achieved by a respective control of the at least one damper and/or the at least one spring based on the determined width of the air gap. The control or the adjustment of the properties of the at least one spring and/or the at least one damper is possible with actuators, wherein preferably to each spring or to each damper an actuator is assigned.

In a further variant of the invention the stator arrangement and/or the rotor arrangement comprises at least one radially extending end stop to prevent a collision of the stator arrangement and the rotor arrangement with each other, in particular in case of a power loss or a regulation or a control malfunction of the generator.

BRIEF DESCRIPTION OF THE DRAWINGS

The invention will in the following be explained in more detail with reference to the schematic drawings.

DETAILED DESCRIPTION OF INVENTION

Figure 1:
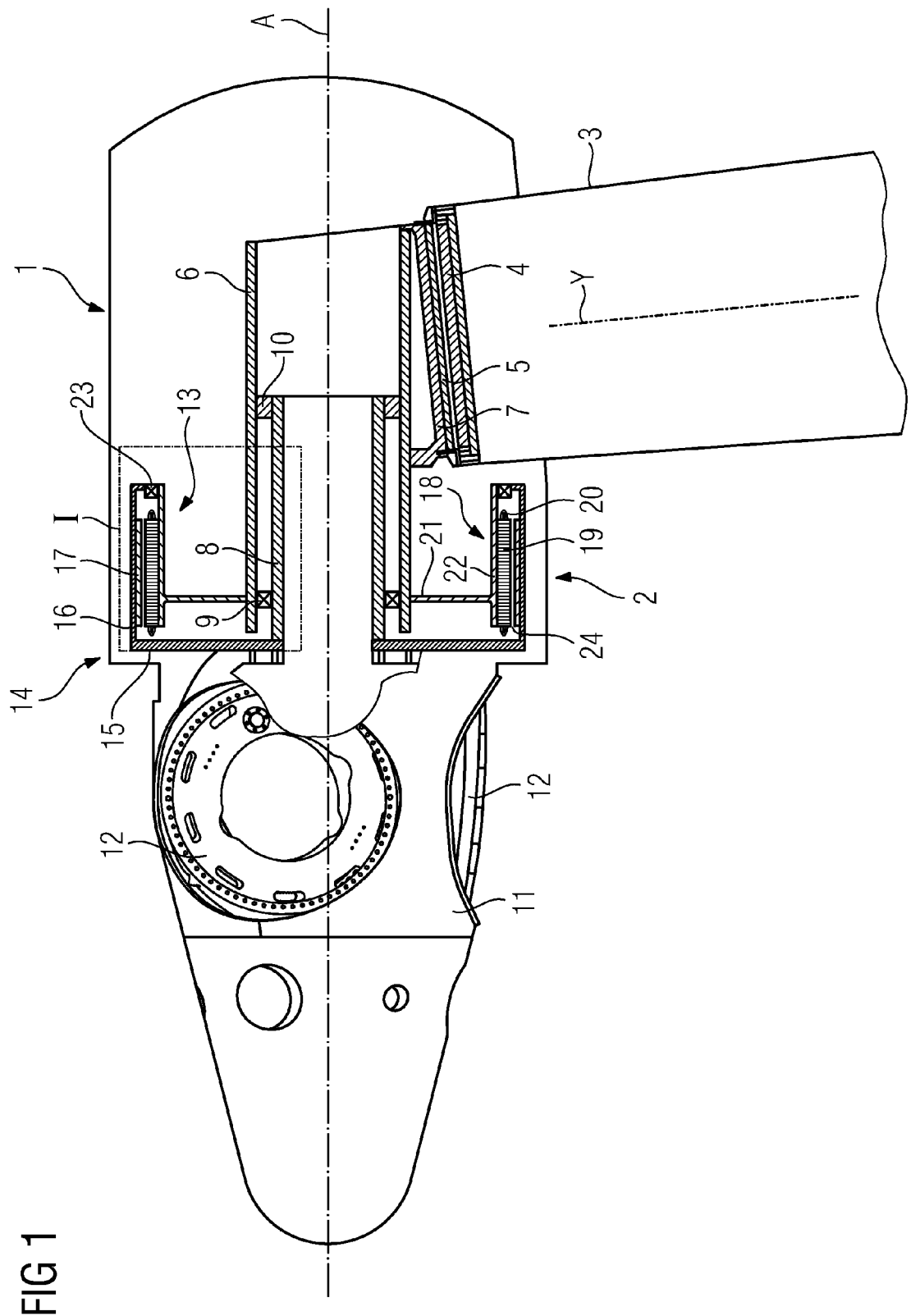
FIG. 1 shows a first type of wind turbine comprising a direct drive generator with a mechanical flexibility in the stator arrangement.

FIG. 1 shows schematically an embodiment of a first inventive wind turbine 1 comprising a direct drive generator 2 having a centre axis A which is arranged on the upwind side of a tower 3 of the wind turbine 1.

A tower flange 4 is arranged on the top of the tower 3. A bedplate 5 is attached to the tower flange 4. The wind turbine 1 comprises in a not explicitly shown manner a yaw system for turning the bedplate 5 of the wind turbine 1 around the axis Y of the tower 3 together with the other components of the wind turbine 1 which are directly or indirectly attached to the bedplate 5.

The wind turbine 1 comprises a stationary outer shaft 6. The rear side of the stationary outer shaft 6 is attached to a retaining arrangement 7 which is attached to the bedplate 5.

A rotatable inner shaft 8 is arranged inside the stationary outer shaft 6 and rotatably supported by two main bearings 9, 10 against the stationary outer shaft 6. A hub 11 is connected to the front end of the rotatable inner shaft 8 e.g. by means of bolts. The hub 11 comprises three mounting devices 12 for three not shown, but well known wind turbine rotor blades. Thus the rotatable inner shaft 8 can turn together with the hub 11.

In case of the present embodiment of the invention the centre axis A of the generator 2 is a joint centre axis of the generator 2, the rotatable inner shaft 8 and the stationary outer shaft 6.

The direct drive generator 2 is arranged on the front side of the stationary outer shaft 6 and the rotatable shaft 8. The direct drive generator 2 comprises a stator arrangement 13 and a rotor arrangement 14 substantially arranged around the stator arrangement 13.

In case of the present embodiment of the invention the rotor arrangement 14 comprises a comparatively stiff or rigid ring-shaped endplate 15 and a hollow cylinder element 16 connected with each other. The ring-shaped endplate 15 and the hollow cylinder element 16 are able to be one unit or the ring-shaped endplate 15 and the hollow cylinder element 16 are able to be two units attached e.g. bolted to each other. The ring-shaped endplate 15 is substantially rectangular arranged relatively to the rotatable shaft 8, the stationary shaft 6 and the centre axis A. In case of the present embodiment of the invention the ring-shaped endplate 15 is mounted between the hub 11 and the front end of the rotatable shaft 8. The hollow cylinder element 16 comprises on the inside a plurality of permanent magnets 17.

The stator arrangement 13 which has a longitudinal extension in the direction of the centre axis A comprises a stator support structure 18 and a lamination stack 19 with a plurality of windings 20. In case of the present embodiment of the invention the stator support structure 18 comprises one stator support element 21 in form of a ring-shaped stator support plate 21 attached e.g. bolted to the outside of the stationary outer shaft 6. The ring-shaped support element 21 is able to be compact or massive or is able to comprise spokes or a spoke structure like a spoked wheel. A kind of hollow cylindrical support element 22 is attached to the outer end of the ring-shaped stator support element 21. The hollow cylindrical support element 22 carries the ring-shaped lamination stack 19 with windings 20. The lamination stack 19 is able to comprise ring segment shaped lamination stack segments each having at least one winding 20 which segments build in their entirety the lamination stack 19.

The hollow cylindrical support element 22 carries additionally a third bearing or support bearing 23 which supports the rotor arrangement 14 or the hollow cylinder element 16 on the rear side against the stator arrangement 13 or the hollow cylindrical support element 22.

In this way the rotor arrangement 14 can turn together with the hub 11 and the rotatable shaft 8 relatively to the stator arrangement 13 for power generation. Thereby the permanent magnets 17 and the lamination stack 19 are substantially arranged oppositely to each other. An air gap 24 having a width of approximately 5 mm is located between the permanent magnets 17 and the lamination stack 19.

For avoiding situations in which the three-bearing arrangement comprising the two main bearings 9, 10 and the support bearing 23 is statically undetermined the stator support element 21 of the stator arrangement 13 comprises and adequate flexibility in the directions of the centre axis A. Thereby the stator support element 21 acts like a membrane supporting the stator arrangement 13 substantially rigidly or firmly in the radial direction so as to maintain the width of the air gap 24, but flexing readily so as to allow e.g. a bending of the rotor arrangement 14 and the rotatable shaft 8 with no major resistance. The stator support element 21 has such dimensions that it has a comparatively little bending stiffness. It simply flexes passively when e.g. the rotatable inner shaft 8 is shifted a bit by deflection. Thus when a bending of the rotatable inner shaft 8 and the rotor arrangement 14 which are connected to each other occurs the stator support element 21 bends respectively in the directions of the centre axis A wherein the width of the air gap 24 is maintained substantially constant or within required tolerances. Thereby an uneven load distribution over the three bearings 9, 10 and 23 of the three bearing arrangement is at least reduced, preferably avoided.

The ring-shaped stator support element 21 needs not to have the mentioned flexibility in the whole plate. Thus the stator support element 21 is able to have different areas. The ring-shaped stator support element 21 may have e.g. a comparatively rigid area e.g. for the attachment to the stationary shaft 6 and an area having the mentioned flexibility in the directions of the centre axis A.

The stator support element 21 is typically made of steel or fibreglass and has a thickness of approximately 10-50 mm, preferably of 10-15 mm. As previously mentioned the front endplate 15 of the rotor arrangement 14 is by contrast comparatively rigid, stiff or thick and preferably made of steel.

In an embodiment of the invention the support bearing 23 is a four-point bearing capable of transmitting high axial loads in both directions of the centre axis A.

As shown in FIG. 1 the stator support element 21 is directly arranged above the front main bearing 9. In this manner it is simpler to maintain the width of the air gap 24 between the rotor arrangement 14 and the stator arrangement 13 substantially constant or within required tolerances in particular at the front end of the direct drive generator 2.

Figure 2:
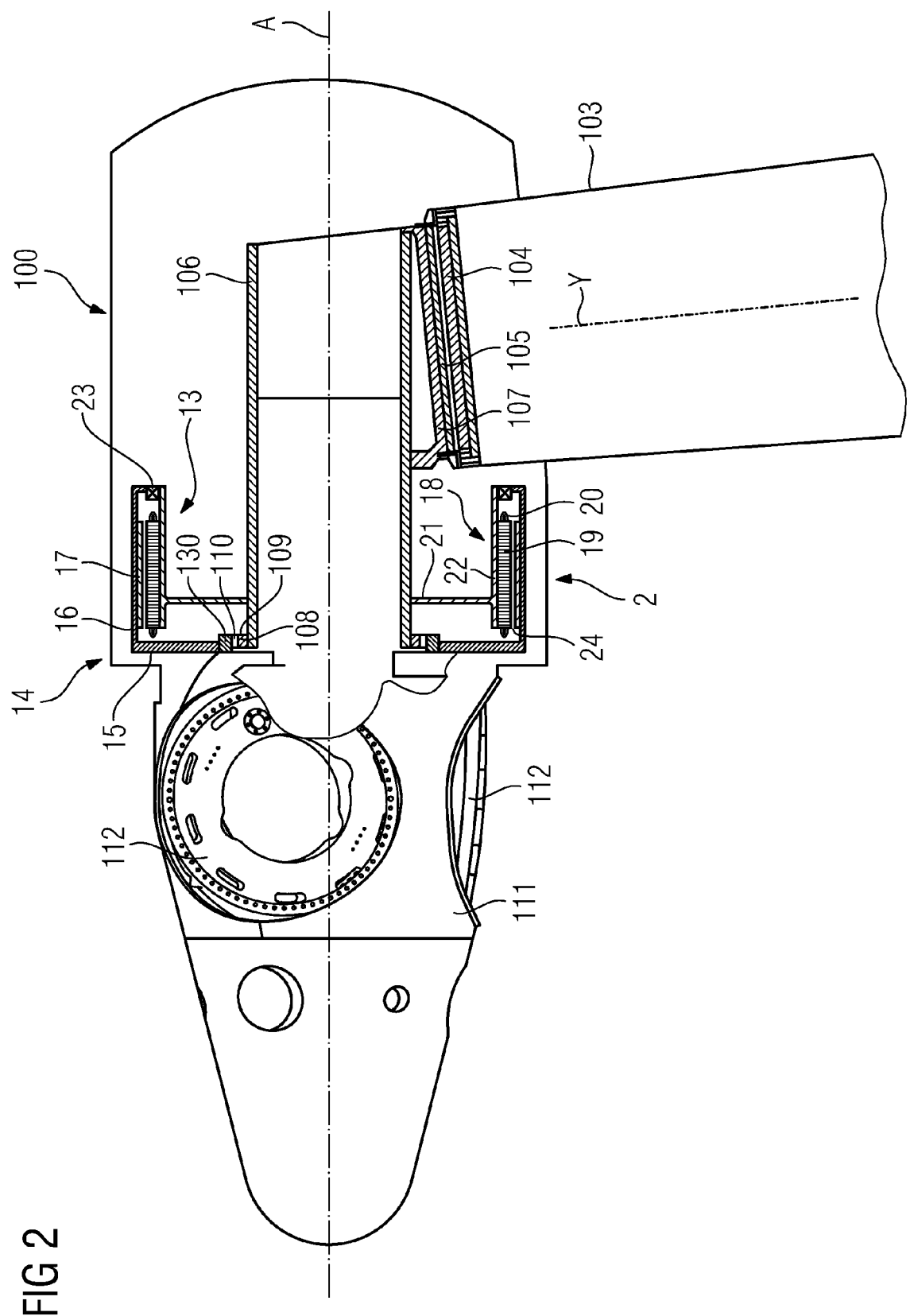
FIG. 2 shows a second type of wind turbine comprising a direct drive generator with a mechanical flexibility in the stator arrangement and FIG. 3-5 show sections of different designs of direct drive generators each having a mechanical flexibility in the stator arrangement.

FIG. 2 shows schematically an embodiment of a second inventive wind turbine 100 comprising a direct drive generator 2 having a centre axis A. Because the direct drive generators of FIG. 1 and FIG. 2 are substantially identical, identical components are provided with the same reference number.

The direct drive generator 2 of FIG. 2 comprising a stator arrangement 13 and a rotor arrangement 14 substantially arranged around the stator arrangement 13 is again arranged on the upwind side of a tower 103 of the wind turbine 100. A tower flange 104 is arranged on the top of the tower 103. A bedplate 105 is attached to the tower flange 104. The wind turbine 100 comprises also in a not explicitly shown manner a yaw system for turning the bedplate 105 of the wind turbine 100 around the axis Y of the tower 103 together with the other components of the wind turbine 100 which are directly or indirectly attached to the bedplate 105.

The wind turbine 100 comprises a stationary shaft 106.

The centre axis A is thereby a joint centre axis of the direct drive generator 2 and the stationary shaft 106. The rear side of the stationary shaft 106 is attached to a retaining arrangement 107 which is attached to the bedplate 105. A main bearing 108 in form of a four-point bearing 108 is arranged on the front side of the stationary shaft 106 which main bearing 108 is capable of transmitting high axial loads in both directions of the centre axis A. An appropriate four-point bearing is e.g. disclosed in DE 201 16 649 U1. The stationary part 109 of the four-point bearing 108 is attached to the stationary shaft 106. The rotating part 110 of the four-point bearing 108 is in case of the present embodiment of the invention connected to a mounting ring 130. The mounting ring 130 is attached e.g. bolted to the hub 111 of the wind turbine 100. The hub 111 comprises three mounting devices 112 for three not shown, but well known wind turbine rotor blades. In this way the mounting ring 130 is able to turn together with the hub 111.

The rotor arrangement 14 of FIG. 2 is identical to the rotor arrangement 14 of FIG. 1 with the single difference that the front ring-shaped endplate 15 of the rotor arrangement 14 of FIG. 2 is attached to the mounting ring 130. Thus the rotor arrangement 14 of FIG. 2 is able to turn together with the hub 111 and the mounting ring 130.

The stator arrangement 13 of FIG. 2 is identical to that one of FIG. 1. Therefore the function of the rotor arrangement 13, the stator arrangement 14 and of the whole direct drive generator 2 of FIG. 2 comply with the function of the rotor arrangement 13, the stator arrangement 14 and of the whole direct drive generator 2 of FIG. 1, for which reason it is referred back to the description of the direct drive generator 2 and his function in context with FIG. 1.

Because the four-point bearing 108 behaves typically like two bearings the wind turbine 100 of FIG. 2 has a kind of three bearing arrangement, in particular when the support bearing 23 is a normal roller bearing or ball bearing. But the wind turbine 100 of FIG. 2 is also able to show the behaviour of a four bearing arrangement, when the support bearing 23 is also a four-point bearing. But in both cases the previously described function of the rotor arrangement 13, the stator arrangement 14 and of the whole direct drive generator 2 is the same. In particular the stator support element 21 comprises the required flexibility to maintain the width of the air gap 24, when a bending of the rotor arrangement 14 occurs in operation of the wind turbine 100. Thereby an uneven load distribution over the bearings 108 and 23 is at least reduced, preferably avoided.

Figure 3:
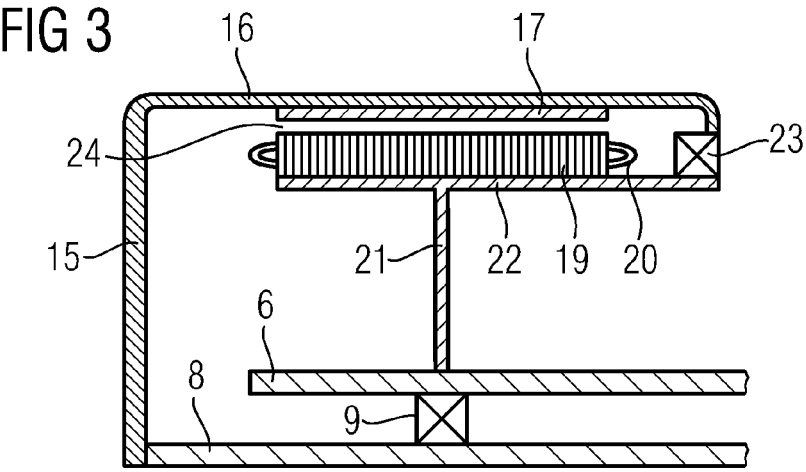
Figure 4:
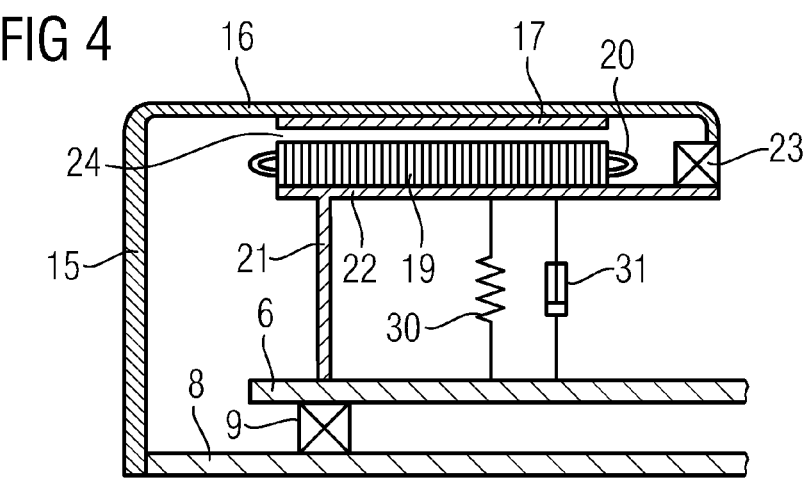
Figure 5:
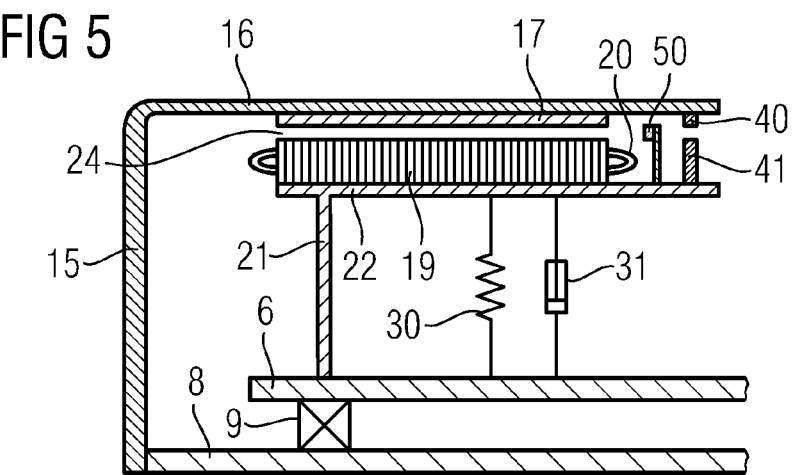

In FIG. 3-FIG. 5 sections of alternative designs of direct drive generators are shown. The sections of FIG. 3-FIG. 5 correspond to section I of FIG. 1. The alternative designs are described based on the wind turbine 1 of FIG. 1. But all alternatives are also in the same way realisable in the wind turbine 100 of FIG. 2.

In FIG. 3 the single ring-shaped stator support element 21 is arranged in the middle of the stator arrangement 13 which has a longitudinal extension in the direction of the centre axis A. The arrangement of the stator support element 21 in the middle of the stator arrangement 13 leads to a more mass balanced arrangement. In this embodiment the lamination stack 19 with windings 20 is substantially supported in its centre of gravity. Thereby also the load of the support bearing 23 is reduced.

The behaviour of the ring-shaped stator support element 21 is the same as previously described. The stator support element 21 again acts like a membrane supporting the stator arrangement 13 substantially rigidly or firmly in the radial direction so as to maintain the width of the air gap 24, but flexing readily so as to allow e.g. a bending of the rotor arrangement 14 and the rotatable shaft 8 with no major resistance as previously described. The front main bearing 9 is again located below the stator support element 21.

According to the embodiment of FIG. 4 the ring-shaped stator support element 21 is again arranged on the front side of the stator arrangement 13. In this embodiment of the invention the stator support structure 18 comprises additionally a plurality of springs 30 and dampers 31. The springs 30 and dampers 31 are preferably arranged around the perimeter of the stationary shaft 6, e.g. every 30° a spring 30 and a damper 31 connects the hollow cylindrical support element 22 and the stationary shaft 6 with each other. Thus twelve springs 30 and twelve dampers 31 are arranged around the perimeter of the stationary shaft 6. Thereby the twelve springs 30 are substantially arranged in a first plane and the twelve dampers 31 are substantially arranged in second plane. Both planes are substantially rectangular oriented in relation to the centre axis A. In case of the present embodiment of the invention the springs 30 and dampers 31 are arranged in parallel, but it is also possible to arrange in each case a spring and a damper in series as a spring-damper-element. Subject to the properties of the springs 30 and dampers 31 the flexing of the stator support element 21 is able to be more or less influenced by means of the springs 30 and the dampers 31. Appropriate dampers and springs are e.g. air dampers or air springs.

In FIG. 5 a further embodiment of the invention is shown, wherein the rear end of the rotor arrangement 14 is unsupported, because there is no support bearing joining the rotor and the stator arrangement with each other. The stator support structure 18 is equipped as shown and described in the context with FIG. 4.

In case of the present embodiment of the invention the stator arrangement 13 as well as the rotor arrangement 14 comprise a ring-shaped end stop to prevent that the permanent magnets 17 and the lamination stack 19 clash with each other e.g. in case of a power loss of the generator 2, a malefaction of the generator 2 etc. The radially inwardly extending ring-shaped end stop 40 of the rotor arrangement 14 is oppositely located to the radially outwardly extending ring-shaped end stop 41 of the stator arrangement 13. In case of a power loss of the generator 2, a malefaction of the generator 2 etc. the ring-shaped end surfaces of the end stops 40, 41 facing each other have contact and slide on each other. In this way a potential collision of the permanent magnets 17 and the lamination stack 19 is able to be avoided.

Additionally the direct drive generator 2 comprises at least one, typically a plurality of distance sensors 50 arranged around the perimeter of the air gap 24. Preferably the distance sensors 50 are optical distance sensors which are insensible in view of the electromagnetic field of the generator 2. The distance sensors 50 are preferably attached to the rear side of the stator arrangement 13, which is also the unsupported side of the rotor arrangement 14. Thereby the attachment to the stator arrangement 13 simplifies the signal transmission of the signals of the distance sensors 50 because of the static structure of the stator arrangement 13. In case of the present embodiment of the invention the distance sensors 50 continuously measure values which are transmitted by means of not shown signal lines to the not explicitly shown control computer of the wind turbine 1. The control computer interprets or evaluates the measured values and determines continuously the respective actual width of the air gap 24 around the perimeter of the air gap 24 on the rear side of the direct drive generator 2, which width can be differ around the perimeter of the air gap 24.

Alternatively the generated currents and/or voltages in operation of the direct drive generator 2 are interpreted or evaluated for the determination of the width of the air gap 24 around the perimeter of the air gap 24. It is e.g. possible to compare the resulting values of the currents and/or voltages with known or calibrated reference values for which the width of the air gap 24 was determined. Thus also in this way the actual width of the air gap 24 around the perimeter of the air gap 24 is able to be determined. The determination is simplified when as previously mentioned the lamination stack comprises ring segment shaped lamination stack segments. In this case the currents and/or voltages of the single lamination stack segments are able to be evaluated or interpreted and thus the width of the air gap within the segments is determined.

Based on the knowledge of the actual width of the air gap 24 around the perimeter of the air gap 24 it is possible to actively regulate and/or control the width of the air gap 24. This can be achieved by a respective control and/or regulation of the adjustments of the dampers 31 and/or the springs 30 based on the determined width of the air gap 24. The control and/or regulation of the adjustments are able to be achieved with not explicitly shown actuators, wherein preferably for each damper 31 and each spring 30 a respective actuator is provided. By means of the actuators the properties of each single spring 30 and each single damper 31 are able to be influenced, e.g. the damping ratio of each damper 31 is able to be adjusted. Thus based on the determined width of the air gap 24 around the perimeter of the air gap 24 in particular on the rear side of the direct drive generator 2, which width can be differ around the perimeter, the control computer of the wind turbine actively regulates and/or controls the width of the air gap 24 by a respective control of the actuators of the springs 30 and dampers 31. The control computers regulates and/or controls the actuators in this way, that the width of the air gap 24 is substantially constant or at least within required tolerances around the perimeter of the air gap 24.

Previously different embodiments of a stator support structure of a direct drive generator were described. These different embodiments are able to be combined with no restriction to achieve a modified solution.

Therefore it is also possible to provide the stator support structure 18 of FIG. 3 with springs and/or dampers on one or both sides of the stator support element 21 or to remove the support bearing 23. In the same way the stator support structure 18 of FIG. 1 or 2 is able to be modified.

The invention claimed is:

1. A wind turbine, comprising:
    a direct drive generator having a stator arrangement, and a rotor arrangement substantially arranged around the stator arrangement and a longitudinal centre axis,
    wherein the stator arrangement comprises a stator support structure, which comprises at least one, substantially radial extending stator support element,
    wherein the stator support element is attached to a stationary shaft, and
    wherein the stationary shaft, which extends substantially parallel to the longitudinal centre axis, is substantially rigid in a radial direction and is at least partially flexible in a direction of the longitudinal centre axis of the generator.

2. The wind turbine according to claim 1, wherein the stator support element is ring-shaped and/or wherein the stator support element comprises a compact form or a spoke structure.

3. The wind turbine according to claim 1, wherein the stator support element is made of steel or fibreglass and/or wherein the stator support element has a thickness of about 10 to 50 mm measured in the direction of the centre axis.

4. The wind turbine according to claim 1,
    wherein the rotor arrangement comprises a ring-shaped front endplate and a hollow cylinder element connected with each other, and
    wherein permanent magnets are arranged on the inside of the hollow cylinder element opposite of the stator arrangement.

5. The wind turbine according to claim 4, wherein the rotor arrangement or the front endplate of the rotor arrangement is at least indirectly connected to a rotatable shaft and/or a hub for turning together with the rotatable shaft and/or the hub.

6. The wind turbine according to claim 5,
    wherein the rotatable shaft is supported inside the stationary shaft via a front and a rear main bearing or
    wherein the front endplate of the rotor arrangement or the rotor arrangement in general is on the front side at least indirectly supported or arranged on the stationary shaft by a front main bearing, and
    wherein the stator support element is arranged close to or directly adjacent or directly above the front main bearing.

7. The wind turbine according to claim 1, wherein the stator arrangement comprises a longitudinal extension in the direction of the centre axis of the generator and wherein the stator support element is substantially arranged on the front side of the stator arrangement.

8. The wind turbine according to claim 1, wherein the stator arrangement comprises a longitudinal extension in the direction of the centre axis of the generator and wherein the stator support element is substantially arranged in the middle of the stator arrangement.

9. The wind turbine according to claim 1, wherein the stator support structure comprises at least one spring and/or at least one damper connected to the stationary shaft.

10. The wind turbine according to claim 9, wherein the at least one spring and the at least one damper are arranged in series or in parallel.

11. The wind turbine according to claim 1, wherein the rotor arrangement is supported against the stator arrangement via a support bearing.

12. The wind turbine according to claim 1, wherein a rear end of the rotor arrangement is unsupported.

13. The wind turbine according to claim 12, wherein the stator arrangement and/or the rotor arrangement comprises at least one radially extending end stop to prevent a collision of the stator arrangement and the rotor arrangement with each other.

14. The wind turbine according to claim 1, wherein a width of an air gap between the stator arrangement and the rotor arrangement is determined by at least one distance sensor and/or by interpretation of generated currents and/or voltages of the direct drive generator.

15. The wind turbine according to claim 14, wherein the width of the air gap between the stator arrangement and the rotor arrangement is actively regulated and/or controlled based on the determined width of the air gap.

\* \* \* \* \*